United States Patent
Wang et al.

(10) Patent No.: US 9,786,326 B2
(45) Date of Patent: Oct. 10, 2017

(54) METHOD AND DEVICE OF PLAYING MULTIMEDIA AND MEDIUM

(71) Applicant: Xiaomi Inc., Beijing (CN)

(72) Inventors: Bin Wang, Beijing (CN); Zhiguang Zheng, Beijing (CN); Dongfang Ji, Beijing (CN)

(73) Assignee: Xiaomi Inc., Beijing (CN)

( * ) Notice: Subject to any disclaimer, the term of this patent is extended or adjusted under 35 U.S.C. 154(b) by 0 days.

(21) Appl. No.: 15/411,765

(22) Filed: Jan. 20, 2017

(65) Prior Publication Data
US 2017/0133060 A1    May 11, 2017

Related U.S. Application Data

(63) Continuation of application No. 14/620,508, filed on Feb. 12, 2015, now Pat. No. 9,589,596, which is a (Continued)

(30) Foreign Application Priority Data

Jun. 6, 2014    (CN) .......................... 2014 1 0250800

(51) Int. Cl.
*G11B 27/22*    (2006.01)
*G11B 27/10*    (2006.01)
(Continued)

(52) U.S. Cl.
CPC .......... *G11B 27/22* (2013.01); *G06F 3/04842* (2013.01); *G06F 3/04847* (2013.01);
(Continued)

(58) Field of Classification Search
None
See application file for complete search history.

(56) References Cited

U.S. PATENT DOCUMENTS

2008/0221881 A1* 9/2008 Carraux ................ G10L 15/22
704/235
2009/0282444 A1   11/2009 Laksono
(Continued)

FOREIGN PATENT DOCUMENTS

CN    1509568 A    6/2004
CN    1808566 A    7/2006
(Continued)

OTHER PUBLICATIONS

Office Action dated Sep. 28, 2016 for Chinese Application No. 201410250800.9, 7 pages.
(Continued)

*Primary Examiner* — Eileen Adams
(74) *Attorney, Agent, or Firm* — Brinks, Gilson & Lione

(57) ABSTRACT

The present disclosure relates to a method and a device for playing multimedia. The method may comprise: obtaining at least one of audio data and subtitle data of a first preset time length before a pause position of a multimedia; determining a starting position of a complete semantic statement according to at least one of the audio data and the subtitle data; and continuing to play the multimedia according to the starting position when an instruction of continuing to play the multimedia is detected or a condition of continuing to play the multimedia is met.

18 Claims, 9 Drawing Sheets

Related U.S. Application Data continuation-in-part of application No. PCT/CN2014/091757, filed on Nov. 20, 2014.

(51) Int. Cl.

| | |
|---|---|
| G06F 3/0484 | (2013.01) |
| G11B 27/30 | (2006.01) |
| G11B 19/02 | (2006.01) |
| H04N 7/088 | (2006.01) |
| G11B 27/28 | (2006.01) |
| G11B 27/00 | (2006.01) |
| H04N 5/76 | (2006.01) |

(52) U.S. Cl.
CPC .......... *G11B 19/022* (2013.01); *G11B 27/005* (2013.01); *G11B 27/102* (2013.01); *G11B 27/105* (2013.01); *G11B 27/28* (2013.01); *G11B 27/30* (2013.01); *H04N 7/0885* (2013.01); *H04N 5/76* (2013.01)

(56) References Cited

U.S. PATENT DOCUMENTS

| | | | |
|---|---|---|---|
| 2011/0200299 A1 | 8/2011 | Kitahara et al. | |
| 2011/0301728 A1 | 12/2011 | Hamilton et al. | |
| 2013/0103770 A1* | 4/2013 | Kamolz | H04L 65/4076 709/206 |
| 2013/0141551 A1 | 6/2013 | Kim | |
| 2014/0040730 A1 | 2/2014 | Prasad | |
| 2014/0253701 A1* | 9/2014 | Wexler | A61F 9/08 348/62 |
| 2015/0032851 A1* | 1/2015 | Lieber | H04L 65/608 709/219 |

FOREIGN PATENT DOCUMENTS

| | | |
|---|---|---|
| CN | 1956504 A | 5/2007 |
| CN | 101438348 A | 5/2009 |
| CN | 101588470 A | 11/2009 |
| CN | 101963968 A | 2/2011 |
| CN | 104038827 A | 9/2014 |
| EP | 2 246 857 A2 | 11/2010 |
| EP | 0 737 016 B1 | 12/2010 |
| JP | 2001-309294 A | 11/2001 |
| JP | 2004-157457 A | 6/2004 |
| JP | 2006-208866 A | 8/2006 |
| JP | 2007-041302 A | 2/2007 |
| JP | 2007-522722 A | 8/2007 |
| JP | 2007-235543 A | 9/2007 |
| JP | 2009-182473 A | 8/2009 |
| JP | 2012-004722 A | 1/2012 |
| RU | 2 512 135 C2 | 4/2014 |
| WO | WO 01/03387 A1 | 1/2001 |
| WO | WO 2005/073972 A1 | 8/2005 |
| WO | WO 2011/158399 A1 | 12/2011 |

OTHER PUBLICATIONS

Office Action dated Oct. 4, 2016 for Japanese Application No. 2016-524682, 6 pages.

Extended European Search Report dated Oct. 12, 2015 for European Application No. 15170892.2, 7 pages.

Office Action dated Mar. 25, 2016 for Russian Application No. 2015105625/08, 9 pages.

International Search Report and Written Opinion dated Mar. 13, 2015 in International Application No. PCT/CN2014/091757.

* cited by examiner

METHOD AND DEVICE OF PLAYING MULTIMEDIA AND MEDIUM

PRIORITY STATEMENT

The present application is a continuation of U.S. patent application Ser. No. 14/620,508, filed on Feb. 12, 2015, pending, which is a continuation-in-part of International Application No. PCT/CN2014/091757, filed on Nov. 20, 2014 that is based on and claims priority of Chinese Patent Application No. 201410250800.9, filed on Jun. 6, 2014, the entire contents of which are incorporated herein by reference.

TECHNICAL FIELD

The present disclosure relates to a field of multimedia processing technology, and more particularly to a method and a device of playing the multimedia.

BACKGROUND

When a video is playing, sometimes a pause may occur either because of an active suspension by a user or because of network transmission issues. The pause may occur at any time during the play or anywhere in the video. Thus likely the pause may be in the middle of a sentence of the video. Accordingly, when the user resumes playing the video, the video will start from the middle of a sentence, or even starts from a half of a character or a word, which is not convenient for the user to pick up content of the video.

Some multimedia playing software or webpage is designed to tape back the video for a few seconds, e.g., 5 seconds, when the user resumes playing the video. The tape-back time is generally a fixed amount of time set in advance. Although the user is given a certain time to help recall the content he/she watched before the video is paused, the predetermined tape-back time does not guarantee the video will resume from a beginning of a sentence. Thus the problem that the user feel inconvenient to pick up the content of a resumed video remains.

SUMMARY

The present disclosure provides a method and a device of playing the multimedia content. When a user stops a multimedia content and resumes it in a later time, the method and content tape back the multimedia and resume the multimedia from a beginning of a sentence.

According to an aspect of the present disclosure, a device may comprise a storage medium storing a set of instructions for playing multimedia; and a processor in communication with the storage medium. When executing the set of instructions, the processor may be directed to: play a multimedia, wherein the multimedia comprises at least one of audio data and subtitle data; pause the multimedia at a pause position; tape back the multimedia from the pause position to obtain a target section from the at least one of audio data and subtitle data; determine a starting position of a semantic statement in the target section as a target starting position; and play the multimedia from the target starting position when a condition to resume playing the multimedia is met.

According to another aspect of the present disclosure, a method for playing multimedia may comprise playing, by an electronic device, a multimedia, wherein the multimedia comprises at least one of audio data and subtitle data; pausing, by the electronic device, the multimedia at a pause position; taping back the multimedia, by the electronic device, to obtain a target section from the at least one of audio data and subtitle data; determining, by the electronic device, a starting position of a semantic statement in the target section as a target starting position; and playing the multimedia, by the electronic device, from the target starting position when a condition to resume playing the multimedia is met.

It is to be understood that both the foregoing general description and the following detailed description are example and explanatory only and are not restrictive of the present disclosure.

BRIEF DESCRIPTION OF THE DRAWINGS

The accompanying drawings, which are incorporated in and constitute a part of this specification, illustrate embodiments consistent with the invention and, together with the description, serve to explain the principles of the invention.

DETAILED DESCRIPTION

Reference will now be made in detail to example embodiments, examples of which are illustrated in the accompanying drawings. The following description refers to the accompanying drawings in which the same numbers in different drawings represent the same or similar elements unless otherwise represented. The implementations set forth in the following description of example embodiments do not represent all implementations consistent with the invention. Instead, they are merely examples of devices and methods consistent with aspects related to the invention as recited in the appended claims.

Multimedia refers to content that uses a combination of different content forms, such as one or more of text, audio, still images, animation, video, an interactivity content forms. For example, the multimedia in the embodiments of the present disclosure may comprise video, audio, and the like. The multimedia is usually recorded and played, displayed, or accessed by information content processing devices, such as computerized and electronic devices, but can also be part of a live performance, through online streaming for example.

During playing, a pause may occur to the multimedia at any time. This may be because the user that is watching the multimedia stops it, or because the network speed is not fast enough so that a player (i.e., an application that plays the multimedia, such as a media player) buffers the multimedia streamed online. If the pause is due to an operation instruction over the player, the electronic device that plays the multimedia may determine that the pause is instructed by the user. If the electronic device detects a corresponding buffer zone of the multimedia and determines that the remaining multimedia data that has not yet been played is insufficient for continuing the play, the electronic device may determine that the pause is due to network connection, such as a slow network download speed.

In the embodiments of the present disclosure, after the playing of the multimedia is paused and resumed, the electronic device may resume playing the multimedia from a beginning of a semantic statement by analyzing a starting point of the semantic statement in at least one of audio data and the subtitle data in the multimedia.

Figure 13:
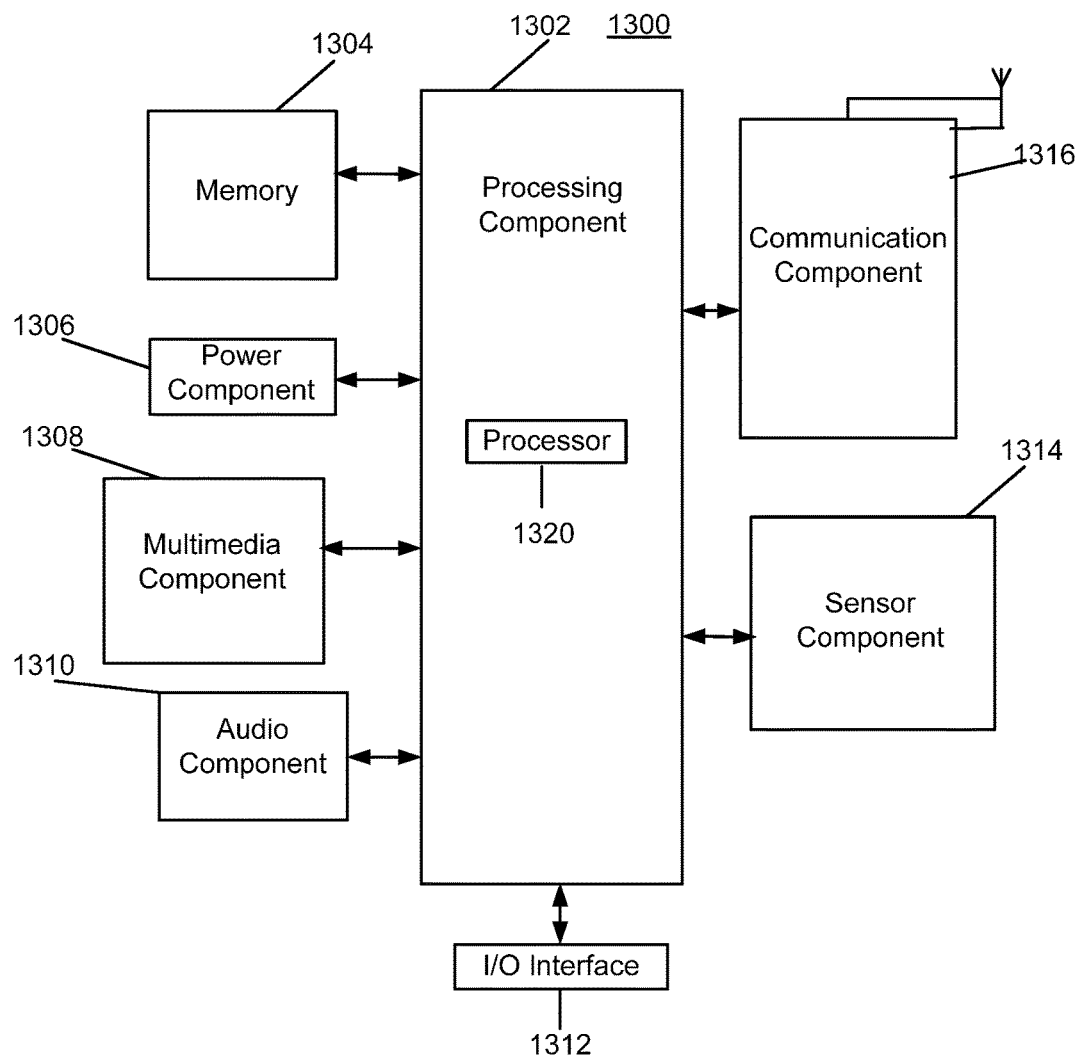
FIG. 13 is a block diagram showing a device for multimedia playing according to an example embodiment.

FIG. 13 is a block diagram showing a device 1300 for multimedia playing according to an example embodiment. For example, the device 1300 may be a mobile phone, a computer, a digital broadcast terminal, a messaging device, a gaming console, a tablet, a medical device, exercise equipment, a personal digital assistant and the like.

Referring to FIG. 13, the device 1300 may include one or more of the following components: a processing component 1302, a memory 1304, a power component 1306, a multimedia component 1308, an audio component 1310, an input/output (I/O) interface 1312, a sensor component 1314, and a communication component 1316.

The processing component 1302 usually controls overall operations of the device 1300, such as the operations associated with display, telephone calls, data communications, camera operations, and recording operations. The processing component 1302 may include one or more processors 1320 to execute instructions to perform all or part of the steps in the above described methods. Moreover, the processing component 1302 may include one or more modules which facilitate the interaction between the processing component 1302 and other components. For instance, the processing component 1302 may include a multimedia module to facilitate the interaction between the multimedia component 1308 and the processing component 1302.

The memory 1304 may be configured to store various types of data to support the operation of the device 1300. Examples of such data include instructions for any application or method operated on the device 800, contact data, phonebook data, messages, pictures, videos, etc. The memory 1304 may be implemented using any type of volatile or non-volatile memory device or combination thereof, such as a static random access memory (SRAM), an electrically erasable programmable read-only memory (EE-PROM), an erasable programmable read-only memory (EPROM), a programmable read-only memory (PROM), a read-only memory (ROM), a magnetic memory, a flash memory, a magnetic or optical disk.

The power component 1306 provides power to various components of the device 1300. The power component 1306 may include a power management system, one or more power sources, and other components associated with the generation, management, and distribution of power in the device 1300.

The multimedia component 1308 includes a screen providing an output interface between the device 1300 and the user. In some embodiments, the screen may include a liquid crystal display (LCD) and a touch panel (TP). If the screen includes the touch panel, the screen may be implemented as a touch screen to receive input signals from the user. The touch panel includes one or more touch sensors to sense touches, slips, and gestures on the touch panel. The touch sensors may not only sense a boundary of a touch or slip action, but also sense a period of time and a pressure associated with the touch or slip action. In some embodiments, the multimedia component 1308 includes a front camera and/or a rear camera. The front camera and/or the rear camera may receive an external multimedia datum while the device 1300 is in an operation mode, such as a photographing mode or a video mode. Each of the front camera and the rear camera may be a fixed optical lens system or have focus and optical zoom capability.

The audio component 1310 may be configured to output and/or input audio signals. For example, the audio component 1310 includes a microphone (MIC) configured to receive an external audio signal when the device 1300 is in an operation mode, such as a call mode, a recording mode, and a voice identification mode. The received audio signal may be further stored in the memory 1304 or transmitted via the communication component 1316. In some embodiments, the audio component 1310 further includes a speaker to output audio signals.

The I/O interface 1312 provides an interface between the processing component 1302 and peripheral interface modules, such as a keyboard, a click wheel, a button, and the like. The button may include, but not limited to, a home button, a volume button, a starting button, and a locking button.

The sensor component 1314 includes one or more sensors to provide status assessments of various aspects of the device 1300. For instance, the sensor component 1314 may detect an open/closed status of the device 1300, relative positioning of components, e.g., the display and the keyboard, of the device 1300, a change in position of the device 1300 or a component of the device 1300, a presence or absence of user contact with the device 1300, an orientation or an acceleration/deceleration of the device 1300, and a change in temperature of the device 1300. The sensor component 1314 may include a proximity sensor configured to detect the presence of nearby objects without any physical contact. The sensor component 1314 may also include a light sensor, such as a CMOS or CCD image sensor, for use in imaging applications. In some embodiments, the sensor component 1314 may also include an accelerometer sensor, a gyroscope sensor, a magnetic sensor, a pressure sensor, or a temperature sensor.

The communication component 1316 may be configured to facilitate communication, wired or wirelessly, between the device 1300 and other devices. The device 1300 can access a wireless network based on a communication standard, such as WiFi, 2G, 3G, 4G, or a combination thereof. In one example embodiment, the communication component 1316 receives a broadcast signal or broadcast associated information from an external broadcast management system via a broadcast channel. In one example embodiment, the communication component 1316 further includes a near field communication (NFC) module to facilitate short-range communications. For example, the NFC module may be implemented based on a radio frequency identification (RFID) technology, an infrared data association (IrDA) technology, an ultra-wideband (UWB) technology, a Bluetooth (BT) technology, and other technologies.

In example embodiments, the device 1300 may be implemented with one or more application specific integrated circuits (ASICs), digital signal processors (DSPs), digital signal processing devices (DSPDs), programmable logic devices (PLDs), field programmable gate arrays (FPGAs), controllers, micro-controllers, microprocessors, or other electronic components, for performing the above method.

In example embodiments, there is also provided a non-transitory computer readable storage medium including instructions, such as included in the memory 1304, executable by the processor 1320 in the device 1300, for performing the above method. For example, the non-transitory computer-readable storage medium may be a ROM, a random access memory (RAM), a CD-ROM, a magnetic tape, a floppy disc, an optical data storage device, and the like.

Merely for illustration, only one processor will be described in devices that execute operations and/or method steps in the following example embodiments. However, it should be note that the devices in the present disclosure may also include multiple processors, thus operations and/or method steps that are performed by one processor as described in the present disclosure may also be jointly or separately performed by the multiple processors. For example, if in the present disclosure a processor of a device executes both step A and step B, it should be understood that step A and step B may also be performed by two different processors jointly or separately in the device (e.g., the first processor executes step A and the second processor executes step B, or the first and second processors jointly execute steps A and B).

Figure 1:
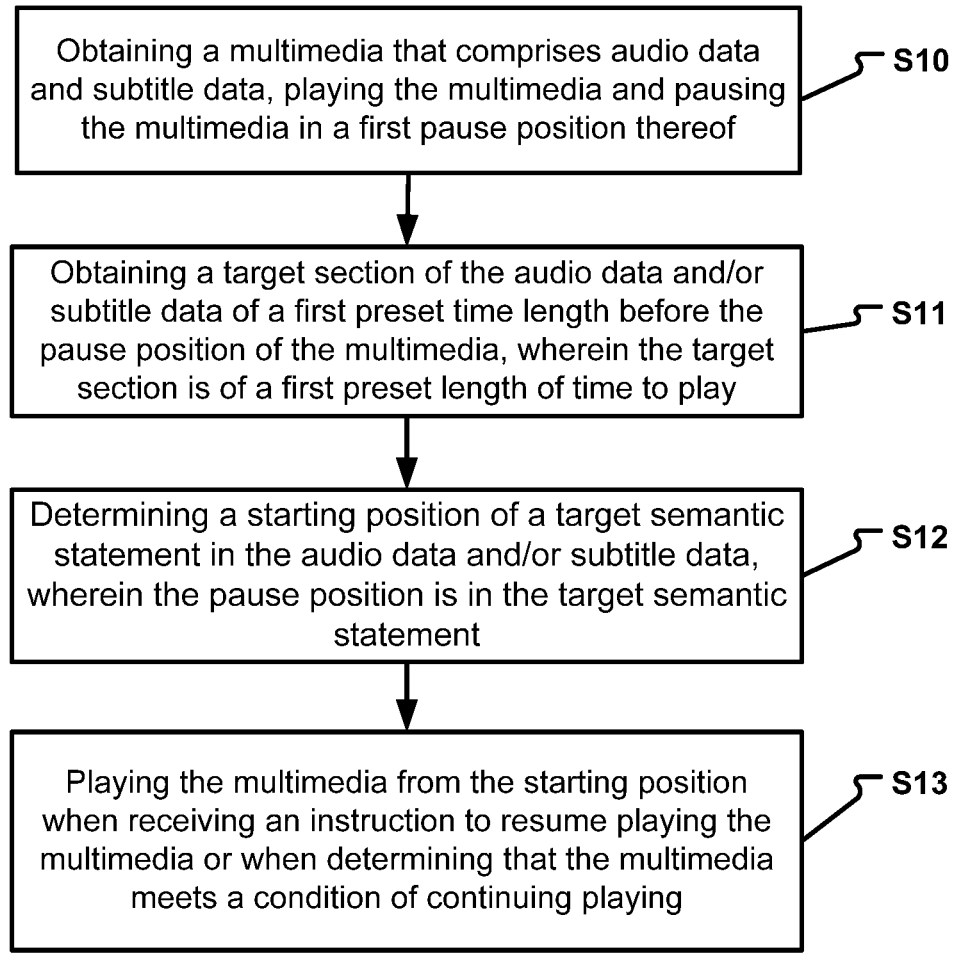
FIG. 1 is a flow chart showing a method for playing a multimedia according to an example embodiment.

FIG. 1 is a flow chart showing a method of playing a multimedia according to an example embodiment. The method may be implemented by the device 1300, i.e., the method may be stored in the memory 1304 of the device 1300 as a set of instructions and be executed by the processor 1320. The method may comprise the following steps:

In step S10, obtaining, by the device, a multimedia that comprises audio data and subtitle data, playing by the device the multimedia and pausing the multimedia in a pause position thereof.

Each of the audio data and subtitle data comprises a plurality of semantic statements. A semantic statement may be a unit that semantically delivers a complete expression. For example, a semantic statement may be a sentence or a paragraph, so that a listener, if the statement is in a form of audio data, or a reader, if the statement is in a form of subtitle, may understand what a speaker of the statement wishes to express and do not need to tape back further in order to pick up the context around the pause position.

The plurality of semantic statements may comprise a target semantic statement being the semantic statement that the multimedia starts to play when the user resumes playing the multimedia. For example, when the multimedia is resumed from the semantic statement where the pause position locates, the target semantic statement may be the semantic statement that includes the pause position. Alternatively, the target statement may also be the Nth semantic statement prior to the pause position, wherein N is a preset integer equal to or greater than 2.

The multimedia may be stored in a memory and/or storage medium of the device and may be played by an application implemented in the device, such as a player. Alternatively, the multimedia may be stored in a remote server and may be transmitted to the device real-time through a network, so that the device only stores a portion of the multimedia downloaded from the server in its storage medium and streams the multimedia in real-time.

The device may pause playing the multimedia due when receiving a pause instruction from a user of the device. Or, when the device is streaming the multimedia and the network speed is not fast enough, the device may detect a corresponding buffer zone that saves the downloaded portions of the multimedia. When the remaining multimedia data that has not yet been played is insufficient for continuing to play, the device may determine to pause playing.

In step S11, obtaining a target section of the audio data and/or subtitle data before the pause position of the multimedia. The section of the audio data and/or subtitle data may be of a first preset length of time to play. The first preset length of time may be longer than a length between a starting position of the target semantic statement and the pause position.

The time length of a complete semantic statement is usually no more than 16 seconds. In the actual application, in step S11, the first preset time length may be 16 seconds.

In step S12, determining and/or finding the starting position of the target semantic statement in the audio data and/or subtitle data.

In step S13, playing the multimedia from the starting position under a predetermined condition.

The predetermined condition may be when the device receives an instruction from the user to resume playing the multimedia, such as when the user click a play button of the player. When the device streams the multimedia from a remote server through the network, the predetermined condition may also be when the remaining multimedia data in the buffer zone that has not yet been played is sufficient for continuing to play.

When the predetermined condition is met, the device may resume playing the multimedia, not from the pause position but from the starting position of the target semantic statement.

As set forth above, a starting position of a complete semantic statement is determined by analyzing at least one of the audio data and the subtitle data; playing of a video or audio is resumed from the determined starting position, so that the user may catch and understand the complete semantic statement, the dialogues in the video or the audio are more natural, and the plots are more continuous, whereby the user's experience for video or audio playing is improved.

Figure 2:
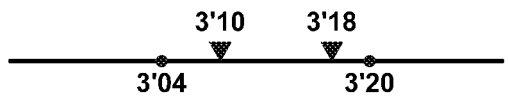
FIG. 2 is a schematic diagram showing a time axis between a pause point of a multimedia and a starting point of a semantic statement in the multimedia according to an example embodiment.

FIG. 2 is a schematic diagram showing a time axis between a pause position and a starting position of the target semantic statement of a video. When the user plays the video on a device, such as device 400, through a player, the user may pause the video at 3 minutes 20 seconds. Accordingly, the pause position of the video may be 20 seconds past 3 minutes. The device may obtain the audio data of the video, find the pause position, tape back 16 seconds from the pause position, i.e., back to 04 seconds past 3 minutes of the video. Then the device may determine a starting position of a complete semantic statement between 3 minutes 04 seconds and 3 minutes 20 seconds of the video, and play the video from the starting position when the user clicks a continue-to-play button on the player.

Figure 3:
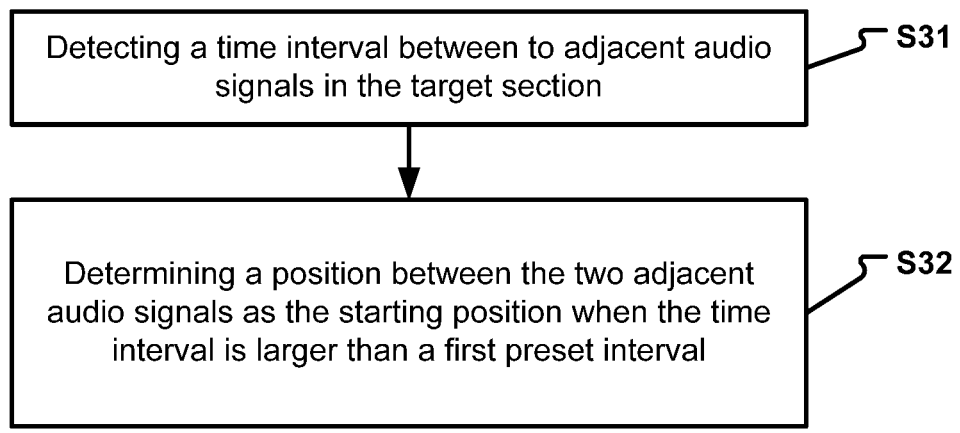
FIG. 3 is a flow chart showing a method of playing a multimedia according to an example embodiment.

FIG. 3 is a flow chart showing a method of playing the multimedia according to an example embodiment. In step S12, when the multimedia comprises the audio data, to determine the starting position of the target semantic statement from the audio data, the device may operate the following steps:

In step S31, determining and/or find a time interval between two adjacent (i.e., successive) audio signals in the audio data.

For example, the audio signal may include a plurality of audio signals in the target section. Between each two adjacent audio signals there may be a time interval. In this step, the device may find a time interval between two adjacent audio signals in the target section. Each audio signal may represent a piece of actor's line. For example, each audio signal may be an actor's line between two natural pauses. For example, a narrative actor's line "The class ended at 5 p.m. On her way home she witnessed a car accident and called 911" may include three natural pauses, thereby three audio signals: "on her way home," "she witnessed a car accident," and "and called 911."

In step S32, determining and/or selecting a position between the two adjacent audio signals as the starting position when the time interval is larger than a first preset time interval. The position may be any time positions between the two adjacent audio signals.

For example, in the video of FIG. 2, the target section of the video may be between 3 minutes 04 seconds and 3 minutes 16 seconds. The target section may include part of a first sentence of a conversation or actor's line and part of a second sentence of the conversation or actor's line, wherein the second sentence is adjacent to and after the first sentence. The pause position falls in the second sentence. A time interval between the two adjacent sentences may be 2 seconds. To continue playing the video, the device may need to determine where the starting point of the second sentence is, To this end, the device may examine time intervals of every two adjacent audio signal in the target section of the video and compare the time interval with the first preset interval. The device may determine that the 2 seconds time interval between the last word of the first sentence and the first word of the second sentence to be larger than the first present time interval (e.g., 0.1 second or 0.5 second). Accordingly, the device may select any time of the 2 seconds as the starting position of the second sentence. For example, the actor's line in the target section of the video may include "The class ended at 5 p.m. On her way home she witnessed a car accident and called 911." The corresponding audio signals in the target section may be "the class ended at 5 p.m.," "on her way home," "she witnessed a car accident," and "and called 911." The device may find there is a 2 seconds time interval between "the class ended at 5 p.m." and "on her way home." Accordingly the device may select any time of the 2 seconds as the starting position of the second sentence.

Figure 4:
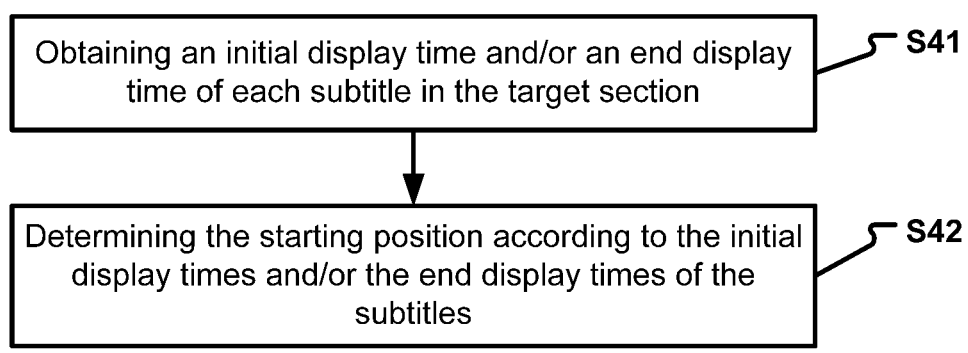
FIG. 4 is a flow chart showing a method of playing a multimedia according to an example embodiment.

FIG. 4 is a flow chart showing a method of playing the multimedia according to an example embodiment. In step S12, when the multimedia comprises the subtitle data, to determine the starting position of the target semantic statement from the subtitle data, the device may operate the following steps:

In step S41, obtaining a display time of each subtitle in the subtitle data.

For example, the device may determine an initial display time and/or end display time of each subtitle in the target section, thereby obtaining the display time of each subtitle in the target section. Here, the subtitle data may comprise a plurality of subtitles. Each subtitle may include a plurality of words which be displayed together. The subtitle may be a full semantic sentence, or may be part of the semantic sentence. When the device plays the video, the plurality of subtitles may be displayed one after another on a screen of the device. Accordingly, each subtitle may correspond to an initial display time and an end display time. Within the time interval between the initial display time and the end display time, the subtitle will remain on the screen so that the user may read it.

In step S42, determining the starting position according to the initial display times and/or the end display times of the plurality of subtitles.

For example, the device may take the end display time of a first subtitle and the initial display time of a second subtitle that is adjacent and after the first subtitle, and determine a time interval between the two adjacent subtitles. When the time interval is greater than a predetermined time interval, the device may determine that the second subtitle is a beginning subtitle of the target semantic statement, and then the device may select a position in the time interval as the target starting position.

In this step, the starting position is determined according to the initial display time and/or the end display time of a subtitle. Since there is a time interval between the two statements, such as 0.1 seconds, and thus the complete statement may be determined according to the interval time length between the audio signals. Similarly, the complete statement may also be determined according to the time interval between the adjacent subtitles when the audio file played by the user has the subtitles. For example, the end display time of the obtained previous subtitle is 04 seconds and 160 milliseconds past 3 minutes, the initial display time of the later subtitle is 04 seconds and 290 milliseconds past 3 minutes, the interval between the two subtitles is 130 milliseconds, namely, 0.13 seconds, and is more than 0.1 seconds, and thus it can be judged that a starting position exists between the two subtitles.

Additionally, in some audio and video files, a subtitle may corresponds to a complete semantic statement, and thus, the starting position may be determined according to the initial display time of the current subtitle or the end display time of the previous subtitle.

As set forth above, by determining the starting position according to the time interval between the adjacent audio signals or the time interval between the adjacent subtitles, the subsequent statements may continue to play the audio or the video according to the starting position, the user may catch and understand the complete semantic statement when continuing to play, the dialogues in the video or the audio are more natural, and the plots are more continuous, whereby the user's experience for video or audio playing is improved.

Figure 5:
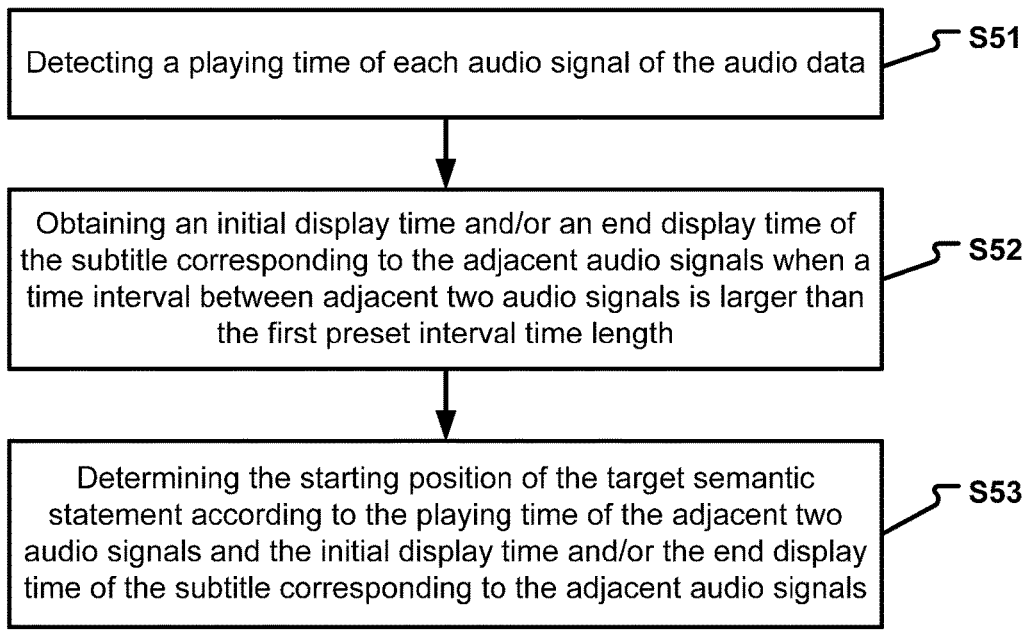
FIG. 5 is a flow chart showing a method of playing a multimedia according to an example embodiment.

FIG. 5 is a flow chart showing a method of playing the multimedia according to an example embodiment. In step S12, when the multimedia comprises both the audio data and the subtitle data, to determine the starting position of the target semantic statement according to the audio data and/or the subtitle data, the device may further operate the following steps.

In step S51, obtaining and/or detecting a playing time of each audio signal of the audio data.

In step S52, obtaining an initial display time and/or an end display time of the subtitle corresponding to the adjacent audio signals when a time interval between two adjacent audio signals is larger than the first preset interval. For example, an actor's line "The class ended at 5 p.m. On her way home she witnessed a car accident and called 911," may corresponds with three corresponding subtitles: "The class ended at 5 p.m.," "On her way home," and "she witnessed a car accident and called 911." The device may determine that the actor's line corresponds with four audio signals: "the class ended at 5 p.m.," "on her way home," "she witnessed a car accident," and "and called 911." The device may determine and/or find that the time interval between "the class ended at 5 p.m.," and "on her way home," is larger than the first preset interval. Accordingly, the device may obtain the end display time of the subtitle "the class ended at 5 p.m.," and the initial display time of the subtitle "on her way home."

In step S53, determining the starting position of the target semantic statement according to the playing time of the two adjacent audio signals and the initial display time and/or the end display time of the subtitle corresponding to the adjacent audio signals.

For example, the device may analyze the audio data and determine that the playing time of the two adjacent audio signals are 09 seconds past 3 minutes and 12 seconds past 3 minutes, respectively. The time interval between the two adjacent audio signals is 3 seconds, which is larger than the first preset time interview, e.g., 0.1 second; however, the show time of the two adjacent subtitles corresponding to the two adjacent audio signals are 08 seconds past 3 minutes and 11 seconds past 3 minutes, and the time interval is also larger than 0.1 seconds (i.e., a second preset time interval, which may be equal to or different from the first preset time interval). Therefore, the device may determine that both the audio signals and the subtitles include a blank time (a time that is neither associated with an audio signal nor associated with a subtitle) at 10 seconds past 3 minutes of this multimedia. Accordingly, the device may determine that the starting point of continuing to play the multimedia is at 10 seconds past 3 minutes.

In this embodiment, the device may analyze both the audio data and the subtitle data and determine an interval position between the two complete semantic statements, so as to obtain the starting point of the target semantic statement more accurately, which neither affects the user to understand the statement nor affects the user to watch the subtitle.

Figure 6:
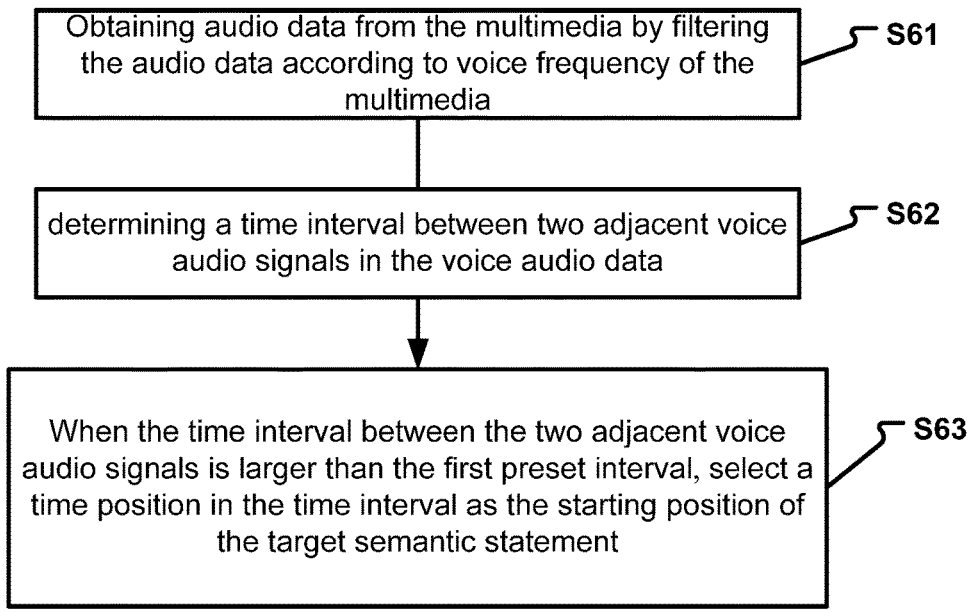
FIG. 6 is a flow chart showing a method of playing a multimedia according to an example embodiment.

FIG. 6 is a flow chart showing a method of playing the multimedia according to an example embodiment. In step S12, when the audio data comprises interfering elements, such as music or environmental sound, to determine the starting position of the target semantic statement according to the audio data, the device may further perform the following steps:

In step S61, obtaining voice audio data from the multimedia by filtering the audio data according to voice frequency of the multimedia.

For example, when the device is playing the multimedia, the device may process the audio data to produce voices, such as music, environmental sound, and human voices when a character in the multimedia speaks. The device may filter the audio data according to the frequency of a voice, such as human voice, and obtain the corresponding voice audio data.

In step S62, determining a time interval between two adjacent voice audio signals in the voice audio data. For example, the voice audio data may include "The class ended at 5 p.m. On her way home she witnessed a car accident and called 911." The device may determine that the voice audio data may include four voice audio signals: "the class ended at 5 p.m.," "on her way home," "she witnessed a car accident," and "and called 911." Accordingly, the device may determine a time interval between two adjacent voice audio signals of the four voice audio signals.

In step S63, when the time interval between the two adjacent voice audio signals is larger than the first preset interval, select a time position in the time interval as the starting position of the target semantic statement. Wherein the start position may be any time position in the time interval and the selection may be stochastic.

In this embodiment, when the audio data includes the interference elements such as the background music (music, environmental sound, etc.) and the human voice, the device may be unable to determine the starting point of the target semantic statement directly from the audio data. Accordingly, the device may first filter the audio data according to general the voice frequency (e.g., human voice frequency) so as to analyze the voice audio signal, and then determine the starting position according to the time interval between the voice audio signals to accurately determine the starting position.

When the target section is long enough, so that there are more than one location meets the standard of starting point (i.e., there is at least one complete semantic statement included in the target section), the device may find two starting positions (or more than two starting positions) corresponding to two complete semantic statements according to the audio data and/or the subtitle data. In this scenario, to resume playing the multimedia, the step S13 may further comprise: continuing to play the multimedia from the starting position closest to the pause position; or continuing to play the multimedia from the Nth starting position before the pause position when the number of statements to tape back is preset as N, where N is an integer greater than or equal to 2.

For example, as shown in FIG. 2, the two starting positions obtained by analyzing the audio data are at 10 seconds past 3 minutes and 18 seconds past 3 minutes, the pause position is at 20 seconds past 3 minutes. The 18 seconds past 3 minutes is the one closest to the pause position and may be selected as a position from which the video continues to be played. But if the number of statements to tape back is preset as 2, namely, the video continues to be played by backing two statements, then 10 seconds past 3 minutes may be selected as a position from which the video continues to be played.

In the above embodiment, when the multiple starting positions are found and/or determined, the device may select one of the starting position as a target starting position to continue to play the multimedia (e.g., audio and video) after pausing, so that the user may catch and understand the complete semantic statement when continuing to play, the dialogues in the video or the audio are more natural, and the plots are more continuous, whereby the user's experience for video or audio playing is improved. The selection of the target starting position may be predetermined or random. For example, the device may select the Nth starting position prior to the pause position as the target starting position, wherein N≥2; or the device may select the starting position right before the pause position as the target starting position.

In step S11 and step S12, when the target section comprises zero starting position, the device may continue taping back the multimedia for the first preset time length to obtain a section of the at least one of audio data and subtitle data until obtaining a section that comprises a starting position of a semantic statement. Then the device may determine that the starting position of the semantic statement as the target starting position. Specifically, when the device is unable to find a starting position of a complete semantic statement (or a target semantic statement) according to the audio data and/or the subtitle data within the target section (i.e., a section that starts from the pause position and tape back for the first preset time length) before the pause position of the multimedia, the device may further perform actions of:

Treating the target section before the pause position as the first target section, taping back the first preset time length and obtaining a second target section of the audio data and/or the subtitle data, wherein the second target section locates before the first target section and has the first preset time length, i.e. the device further tapes back the first preset time length from the first target section;

Searching, finding, or determining a starting position (or more than one starting position) of a complete semantic statement in the second target section; and If no starting position can be found in the second target section, taping back from the section target section for the first preset time length to obtain a third target section, and searching a starting position of a complete semantic statement in the third target section. The device may continue taping back as set forth above until it obtains a target section including one or more starting position of a complete semantic statement.

Figure 7:
FIG. 7 is a schematic diagram showing a time axis between a pause position of a multimedia and a starting point of a semantic statement in the multimedia according to an example embodiment.

For example, FIG. 7 is a schematic diagram showing a time axis between a pause position and a starting position of a video according to an example embodiment. As shown in FIG. 7, when the user plays the video, the pause position is at 20 seconds past 3 minutes, and no starting position of a complete semantic statement is obtained in the 16 seconds first target section before the pause position, namely, from 04 seconds past 3 minutes to 20 seconds past 3 minutes. Then, the device may tape back the audio data and/or the subtitle data of the video for another 16 seconds before 04 seconds past 3 minutes to obtain the second target section, i.e., from 48 seconds past 2 minutes to 04 seconds past 3 minutes. The device then may start to search, find, and/or determine a starting position of a complete semantic statement in the second target section.

If no starting position exists in the second target section, the device may continue to tape back for 16 second and obtain a new target section until it finds a starting position as the target starting position for resuming the video, so that the user may catch and understand the complete semantic statement when continuing to play the audio and video, the dialogues in the video or the audio are more natural, and the plots are more continuous, whereby the user's experience for the video or audio playing is improved.

In step S11, the device may obtain the target section by taping back from the pause position the first present time length to a first position, and then obtain the section of the audio data and/or subtitle data between the pause position and the first position. Alternatively, the device may also obtain the target section from a point other than the pause position. For example, the device may tape back from the pause position for a second present time length to obtain a second position, and then starting from the second position, further tape back the audio data and/or subtitle data for the first preset time length to obtain a third position. The device then may obtain the audio data and/or the subtitle data between the second position and the third position as the target section for finding and/or determining the starting position.

Accordingly, in step S12, the starting position of the complete semantic statement is determined according to at least one of the audio data and the subtitle data within the first preset time length before the time position.

Figure 8:
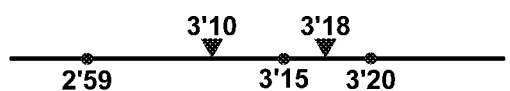
FIG. 8 is a schematic diagram showing a time axis between a pause position of a multimedia and a starting point of a semantic statement in the multimedia according to an example embodiment.

For example, FIG. 8 is a schematic diagram showing a time axis between a pause position and a starting position according to an example embodiment. As shown in FIG. 8, the pause position is at 20 seconds past 3 minutes, the first preset time length is 16 seconds, the second preset time length is 5 seconds, at least one of the audio data and the subtitle data of 16 seconds before 15 seconds past 3 minutes, namely from 59 seconds past 2 minutes to 15 seconds past 3 minutes, is obtained. The starting position obtained by analysis is at 18 seconds past 3 minutes.

In this embodiment, a time position for a period of time such as 5 seconds before the pause position may be firstly selected by the device, and is then taken as a starting point for finding a starting position of a complete semantic statement backwards, so that the user may obtain more extra time to enter into video plot.

For example, as shown in FIG. 8, two starting positions obtained by analysis are at 10 seconds past 3 minutes and 18 seconds past 3 minutes, which are respectively before the above time position (15 seconds past 3 minutes) and between the above time position and the pause position (20 seconds past 3 minutes), both of the two starting positions are used as a starting point from which the playing of the audio and video after paused is continued.

The device may tape backward through the audio data and/or the subtitle data for 16 seconds from the above time position (15 seconds past 3 minutes), and then determine the starting position of the complete semantic statement from the 16 seconds audio data and/or subtitle data section (the target section). The device may continue the tape back as set forth above until at least one starting position of a complete semantic statement is determined.

In the alternative solutions, when taking the time position for a period of time before the pause position as a starting point for finding a starting position of a complete semantic statement backwards, the determined starting position may be before the time position, and may also between the time position and the pause position. Therefore, the selection of the starting point for continuing to play the audio and video after pause is more flexible, so that the user may catch and understand the complete semantic statement when continuing to play the audio and video, the dialogues in the video or the audio are more natural, and the plots are more continuous, whereby the user's experience for the video or audio playing is improved.

Hereinafter, two specific examples will be respectively listed to describe the method of playing the multimedia of the present disclosure.

Figure 9:
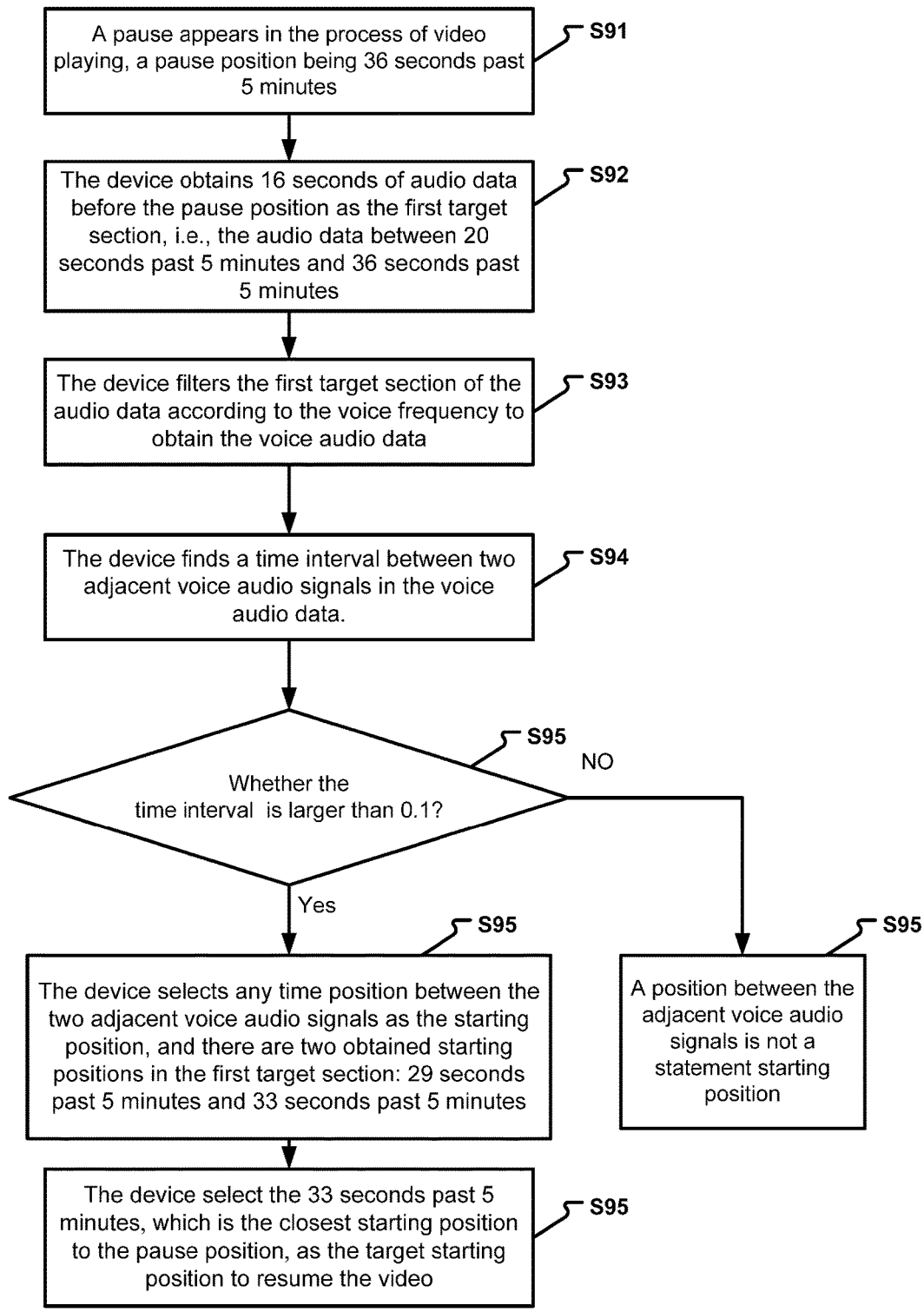
FIG. 9 is a flow chart showing a method of playing a multimedia according to an example embodiment.

FIG. 9 is a flow chart showing a method of playing the multimedia according to an example embodiment. The method may be implemented by the device 1300, i.e., the method may be stored in the memory 1304 of the device 1300 as a set of instructions and be executed by the processor 1320. The method may comprise the following steps.

In step S91, a pause occurs in playing a video, and a pause position is at 5 minutes and 36 seconds.

In step S92, the device obtains 16 seconds of audio data before the pause position as the first target section, i.e., the audio data between 20 seconds past 5 minutes and 36 seconds past 5 minutes.

In step S93, the device filters the first target section of the audio data according to the voice frequency to obtain the voice audio data.

In step S94, the device finds a time interval between two adjacent voice audio signals in the voice audio data.

In step S95, the device determines whether the time interval between the two adjacent voice audio signals is larger than 0.1 seconds; if yes, the method proceeds to step S96; if no, the device determines that a position between the adjacent voice audio signals is not a starting position.

In step S96, the device selects any time position between the two adjacent voice audio signals as the starting position, and there are two obtained starting positions in the first target section: 29 seconds past 5 minutes and 33 seconds past 5 minutes.

In step S97, the device select the 33 seconds past 5 minutes, which is the closest starting position to the pause position, as the target starting position to resume the video.

Figure 10:
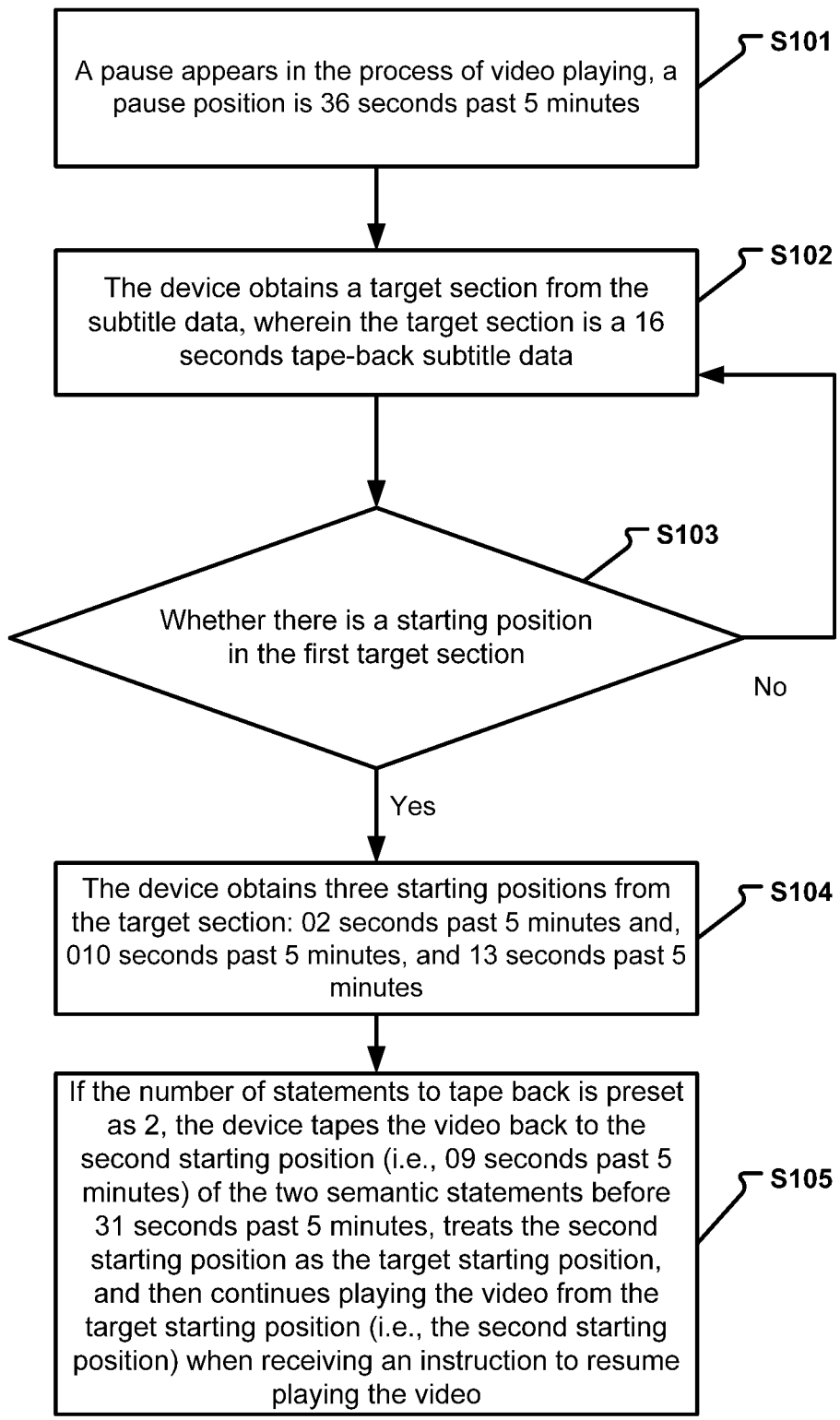
FIG. 10 is a flow chart showing a method of playing a multimedia according to an example embodiment.

FIG. 10 is a flow chart showing a method of playing the multimedia according to an example embodiment. The method may be implemented by the device 1300, i.e., the method may be stored in the memory 1304 of the device 1300 as a set of instructions and be executed by the processor 1320. The method may comprise the following steps.

In step S101, a pause occurs in the process of video playing, and a pause position is 5 minutes and 36 seconds.

In step S102, the device obtains the first target section from the subtitle data, wherein the first target section is a 16 seconds subtitle data taping back starting from 5 seconds before the pause position, i.e. 31 seconds past 5 minutes.

In step S103, the device determines whether there is a starting position in the first target section; if yes, the method proceeds to step S104, if no, the method returns to step S102 to obtain a second target section of the subtitle data. The second target section is a 16 seconds subtitle data taped back from the first target section, i.e., tapped back from 15 seconds past 5 minutes of the video.

In step S104, the device obtains three starting positions from the obtained target section (e.g., the first or the second target section): 02 seconds past 5 minutes, 09 seconds past 5 minutes, and 13 seconds past 5 minutes.

In step S105, if the number of statements to tape back is preset as 2, the device tapes the video back to the second starting position (i.e., 09 seconds past 5 minutes) of the two semantic statements before 31 seconds past 5 minutes, treats the second starting position as the target starting position, and then continues playing the video from the target starting position (i.e., the second starting position) when receiving an instruction to resume playing the video.

In the above example embodiments, the audio and the video may continue to be played flexibly according to the determined starting position by analyzing at least one of the audio data and the subtitle data, so that the user may catch and understand a complete semantic statement when continuing to play the audio and the video after pausing, the dialogues in the video or the audio are more natural, and the plots are more continuous, whereby the user's experience for the video or audio playing is improved.

Figure 11:
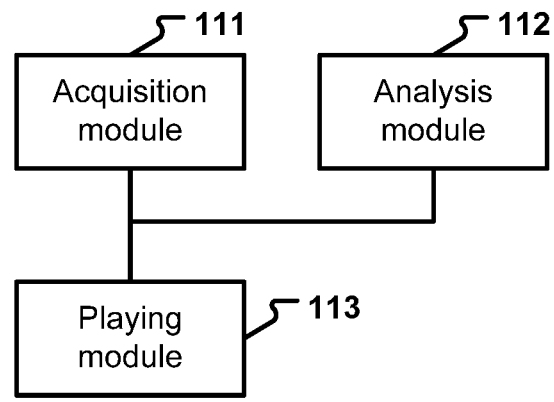
FIG. 11 is a block diagram showing a device of playing a multimedia according to an example embodiment.

FIG. 11 is a block diagram showing a device of playing the multimedia according to an example embodiment. The device may be the device 1300. Further, the device may comprise an acquisition module 111, an analysis module 112, and a playing module 113.

The acquisition module 111 may be configured to acquire at least one of audio data and subtitle data of a first preset time length before a pause position of a multimedia.

The analysis module 112 may be configured to determine a starting position of a complete semantic statement according to at least one of the audio data and the subtitle data obtained by the acquisition module.

The playing module 113 may be configured to continue to play the multimedia according to the starting position determined by the analysis module when an instruction of continuing to play the multimedia is detected or a condition of continuing to play the multimedia is met.

Figure 12A:
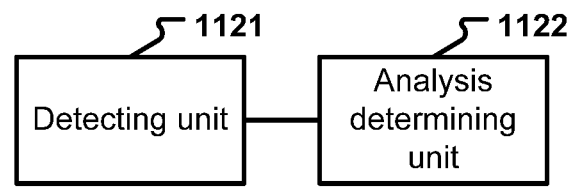
FIG. 12a is a block diagram showing an analysis module according to an example embodiment.

FIG. 12a is a block diagram showing the analysis module 112 according to an example embodiment. The analysis module 112 may comprise: a detecting unit 1121 and an analysis determining unit 1122.

The detecting unit 1121 may be configured to detect a time interval between two adjacent audio signals in the audio data obtained by the acquisition module 111.

The analysis determining unit 1122 may be configured to select any time positions between the two adjacent audio signals as the starting position when the time interval between two adjacent audio signals is larger than the first preset interval.

Figure 12B:
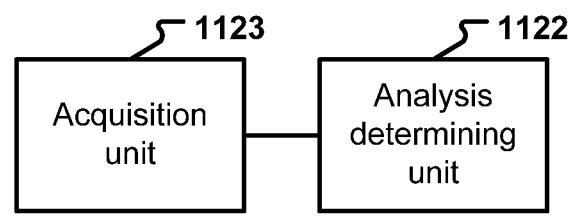
FIG. 12b is a block diagram showing an analysis module according to an example embodiment.

FIG. 12b is a block diagram showing the analysis module 112 according to an example embodiment. The analysis module 112 may comprise: an acquisition unit 1123 and an analysis determining unit 1122.

The acquisition unit 1123 may be configured to acquire an initial display time and/or an end display time of each subtitle in the subtitle data obtained from the acquisition module 111.

The analysis determining unit 1122 may be configured to determine the starting position according to the initial display time and/or the end display time of the subtitle obtained by the acquisition unit 1123.

Figure 12C:
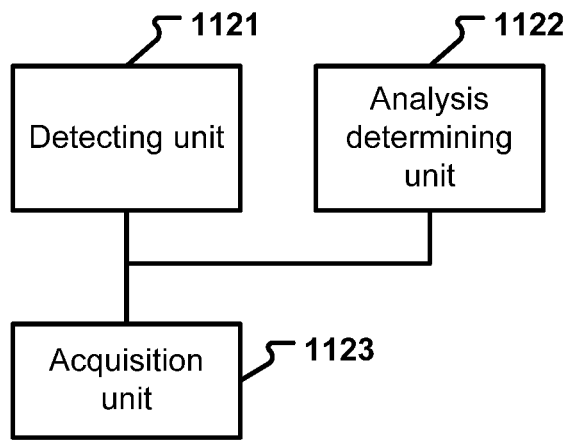
FIG. 12c is a block diagram showing an analysis module according to an example embodiment.

FIG. 12c is a block diagram showing the analysis module 112 according to an example embodiment. The analysis module 112 may comprise: a detecting unit 1121, an acquisition unit 1123 and an analysis determining unit 1122.

The detecting unit 1121 may be configured to detect a playing time of each audio signal of the audio data obtained by the acquisition module 111.

The acquisition unit 1123 may be configured to acquire an initial display time and/or an end display time of the subtitle corresponding to the adjacent audio signals when a time interval between two adjacent audio signals detected by the detecting unit 1121 is larger than a first preset interval.

The analysis determining unit 1122 may be configured to determine the starting position according to the playing time of the two adjacent audio signals and the initial display time and/or the end display time of the subtitle corresponding to the adjacent audio signals obtained by the acquisition unit 1123.

Figure 12D:
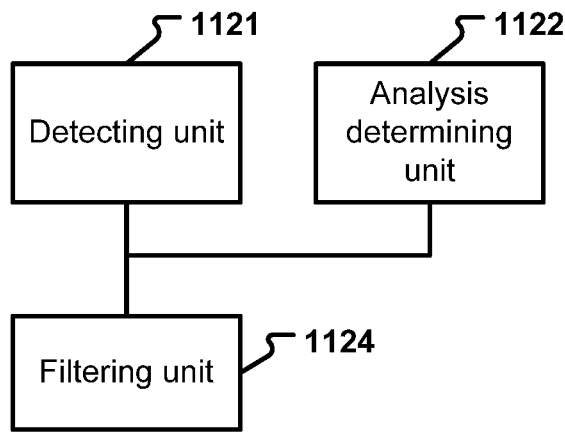
FIG. 12d is a block diagram showing an analysis module according to an example embodiment.

FIG. 12d is a block diagram showing the analysis module 112 according to an example embodiment. The analysis module 112 may further comprise: a filtering unit 1124.

The filtering unit 1124 may be configured to filter the audio data obtained by the acquisition module 111 according to voice frequency to obtain voice audio data.

The detecting unit 1121 may be configured to detect a time interval between two adjacent voice audio signals in the voice audio data filtered by the filtering unit 1124.

The analysis determining unit 1122 may be configured to determine and/or select any time positions between the two adjacent voice audio signals as the starting position when the time interval between two adjacent voice audio signals detected by the detecting unit 1121 is larger than the first preset interval.

The playing module 113 may be configured to continue to play the multimedia from the starting position closest to the pause position when the starting positions of at least two complete semantic statements are determined by the analysis module 112; or continue to play the multimedia from the Nth starting position before the pause position when the number of return statements is preset as N, where N is an integer greater than or equal to 2.

The acquisition module 111 may be configured to acquire at least one of the audio data and the subtitle data of the first preset time length according to the time sequence from back to front, wherein the playing time of at least one of the audio data and the subtitle data of the first preset time length obtained currently is located before the playing time of at least one of the audio data and the subtitle data of the first preset time length obtained last time, when the starting position of the complete semantic statement is not determined by the analysis module 112 according to at least one of the audio data and the subtitle data within the first preset time length before the pause position of the multimedia.

The analysis module 112 may be configured to determine the starting position of the complete semantic statement from at least one of the audio data and the subtitle data of the first preset time length currently obtained by the acquisition module 111, and continue to acquire at least one of the audio data and the subtitle data of the first preset time length and determine the starting position of the complete semantic statement according to the time sequence from back to front until at least one starting position of a complete semantic statements is determined, if the starting position of the complete semantic statement is not determined from at least one of the audio data and the subtitle data of the first preset time length obtained currently.

The acquisition module 111 may be configured to acquire a time position located before the pause position of the multimedia and spaced from the pause position at a second preset time length; and obtaining at least one of the audio data and the subtitle data within the first preset time length before the time position.

The analysis module 112 may be configured to determine the starting position of the complete semantic statement according to at least one of the audio data and the subtitle data within the first preset time length before the time position.

With respect to the device in the above embodiments, specific operations performed by each module have been described in detail in the embodiments of related method, and detailed description will not be repeated here.

According to another example embodiment, a non-transitory computer readable storage medium, when instructions in the storage medium are executed by the processor of a mobile terminal, the mobile terminal may execute a method of playing the multimedia, the method comprises:

obtaining at least one of audio data and subtitle data of a first preset time length before a pause position of a multimedia;

determining a starting position of a complete semantic statement according to at least one of the audio data and the subtitle data; and continuing to play the multimedia according to the starting position when an instruction of continuing to play the multimedia is detected or a condition of continuing to play the multimedia is met.

Alternatively, the determining the starting position of the complete semantic statement according to the audio data comprises:

detecting a time interval between two adjacent audio signals in the audio data; and determining any of time positions between the two adjacent audio signals as the starting position when the time interval between two adjacent audio signals is larger than a first preset interval.

Alternatively, the determining the starting position of the complete semantic statement according to the subtitle data comprises:

obtaining an initial display time and/or an end display time of each subtitle in the subtitle data; and determining the starting position according to the initial display time and/or the end display time of the subtitle.

Alternatively, the determining the starting position of the complete semantic statement according to the audio data and the subtitle data comprises:

detecting a playing time of each audio signal of the audio data;

obtaining an initial display time and/or an end display time of the subtitle corresponding to the adjacent audio signals when a time interval between two adjacent audio signals is larger than a first preset interval; and determining the starting position according to the playing time of the two adjacent audio signals and the initial display time and/or the end display time of the subtitle corresponding to the adjacent audio signals.

Alternatively, the determining the starting position of the complete semantic statement according to the audio data comprises:

filtering the audio data according to voice frequency to obtain voice audio data;

detecting a time interval between two adjacent voice audio signals in the voice audio data; and determining any of time positions between the two adjacent voice audio signals as the starting position when the time interval between two adjacent voice audio signals is larger than the first preset interval.

Alternatively, the continuing to play the multimedia according to the starting position, when the starting positions of at least two complete semantic statements are determined according to at least one of the audio data and the subtitle data comprises:

continuing to play the multimedia from the starting position closest to the pause position; or continuing to play the multimedia from the Nth starting position before the pause position when the number of return statements is preset as N, where N is an integer greater than or equal to 2.

Alternatively, when the starting position of the complete semantic statement is not determined according to at least one of the audio data and the subtitle data within the first preset time length before the pause position of the multimedia, the method further comprises:

obtaining at least one of the audio data and the subtitle data of the first preset time length according to the time sequence from back to front, wherein the playing time of at least one of the audio data and the subtitle data of the first preset time length obtained currently is located before the playing time of at least one of the audio data and the subtitle data of the first preset time length obtained last time;

determining the starting position of the complete semantic statement from at least one of the audio data and the subtitle data of the first preset time length obtained currently; and continuing to acquire at least one of the audio data and the subtitle data of the first preset time length and determining the starting position of the complete semantic statement according to the time sequence from back to front until at least one starting position of a complete semantic statements is determined, if the starting position of the complete semantic statement is not determined from at least one of the audio data and the subtitle data of the first preset time length obtained currently.

Alternatively, the obtaining at least one of the audio data and the subtitle data within the first preset time length before the pause position of the multimedia comprises:

obtaining a time position located before the pause position of the multimedia and spaced from the pause position at a second preset time length;

obtaining at least one of the audio data and the subtitle data within the first preset time length before the time position; and the determining the starting position of the complete semantic statement according to at least one of the audio data and the subtitle data comprises:

determining the starting position of the complete semantic statement according to at least one of the audio data and the subtitle data within the first preset time length before the time position.

After considering this description and carrying out the embodiments disclosed herein, those skilled in the art may easily anticipate other implementations of the present disclosure. The present disclosure is meant to cover any variations, usage or adaptive change of these embodiments, and these variations, usage or adaptive change follow general concept of the present disclosure and include the common knowledge or the customary technical means in the technical field that is not disclosed in the present disclosure. The description and embodiments are only example, and the real range and spirit of the present disclosure are defined by the following claims.

It should be understood that the present disclosure is not limited to precise structures that are described above and shown in the accompanying drawings, and may be modified and changed without departing from the range of the present disclosure. The scope of the present disclosure is only defined by the appended claims.

The invention claimed is:

1. A device, comprising:
a storage medium storing a set of instructions for playing multimedia data; and
a processor in communication with the storage medium, wherein when executing the set of instructions, the processor is directed to:
receive multimedia data for play back and store the multimedia data in a multimedia data buffer, wherein the multimedia data comprises audio data;
play back the multimedia data from the multimedia data buffer;
pause play back of the multimedia data at a pause position;
extract a target section of the audio data from the multimedia data buffer that precedes the pause position, the target section being a specified duration in length and comprising a plurality of audio signals;
identify a time interval between adjacent audio signals;
determine whether the identified time interval is larger than a first predefined time interval;
when the identified time interval is larger than the first predefined time interval, select a position within the time interval and set the selected position as a resume play back position; and
resume play back of the multimedia data from the resume play back position when a resume condition has been met.

2. The device of claim 1, wherein the target section that is selected immediately precedes the pause position.

3. The device of claim 1, wherein the target section that is selected is offset from the pause position by a predefined offset interval.

4. The device of claim 1, wherein the processor is further directed to:
pause play back of the multimedia data at the pause position based on a determination that an amount of data in the multimedia data buffer is insufficient for continuing play back; and
wherein the resume condition is met when the amount of data in the multimedia data buffer is sufficient for continuing play back.

5. A device, comprising:
a storage medium storing a set of instructions; and
a processor in communication with the storage medium, wherein when executing the set of instructions, the processor is directed to:
receive multimedia data for play back and store the multimedia data in a multimedia data buffer, wherein the multimedia data comprises audio data;
play back the multimedia data from the multimedia data buffer;
pause play back of the multimedia data at a pause position;
extract a target section of the audio data from the multimedia data buffer that precedes the pause position, the target section being a specified duration in length and comprising a plurality of semantic statements;
identify a respective time interval between each pair of adjacent audio signals in the target section;
determine, for each pair of adjacent audio signals, whether the respective time interval exceeds a first predefined time interval;
when the respective time interval exceeds the first predefined time interval, identify the respective time interval as comprising a beginning of a semantic statement;
select a position within one of the respective time intervals comprising a beginning of a semantic statement;
set the selected position as a resume play back position; and
resume play back of the multimedia data from the resume play back position when a resume condition has been met.

6. The device of claim 5, wherein the one of the respective time intervals is the respective time interval that immediately precedes the pause position.

7. The device of claim 5, wherein the one of the respective time intervals is the respective time interval that comprises a beginning of an Nth semantic statement preceding the pause position, wherein N≥2.

8. The device of claim 5, wherein the one of the respective time intervals is randomly selected by the processor.

9. The device of claim 5, wherein the semantic statement is a sentence or a paragraph, and the beginning of the semantic statement is a starting position of the sentence or the paragraph.

10. A method for playing multimedia data, comprising:
receiving, by an electronic device, multimedia data for play back and storing the multimedia data in a multimedia data buffer, wherein the multimedia data comprises audio data;
playing back the multimedia data from the multimedia data buffer by the electronic device;
pausing play back of the multimedia data by the electronic device at a pause position;
extracting, by the electronic device, a target section of the audio data preceding the pause position, the target section being a specified duration in length and comprising a plurality of audio signals;
identifying a time interval between adjacent audio signals;
determining whether the identified time interval is larger than a first predefined time interval;
when the identified time interval is larger than the first predefined time interval, selecting a position within the time interval and setting the selected position as a resume play back position; and
resuming play back of the multimedia data by the electronic device from the resume play back position when a resume condition has been met.

11. The method of claim 10, wherein the target section that is selected immediately precedes the pause position.

12. The method of claim 10, wherein the target section that is selected is offset from the pause position by a predefined offset interval.

13. The method of claim 10, further comprising:
pausing play back of the multimedia data at the pause position based on a determination that an amount of data in the multimedia data buffer is insufficient for continuing to play the multimedia data; and
wherein the resume condition is met when the amount of data in the multimedia data buffer is sufficient for continuing play back.

14. A method for playing multimedia data, comprising:
receiving, by an electronic device, multimedia data for play back and storing the multimedia data in a multimedia data buffer, wherein the multimedia data comprises audio data;
playing back the multimedia data from the multimedia data buffer by the electronic device;
pausing play back of the multimedia data by the electronic device at a pause position;
extracting, by the electronic device, a target section of the audio data preceding the pause position, the target section being a specified duration in length and comprising a plurality of semantic statements;
identifying a respective time interval between each pair of adjacent audio signals in the target section;
determining, for each pair of adjacent audio signals, whether the respective time interval exceeds a first predefined time interval;
when the respective time interval exceeds the first predefined time interval, identifying the respective time interval as comprising a beginning of a semantic statement;
selecting a position within one of the respective time intervals comprising a beginning of a semantic statement;
setting the selected position as a resume play back position; and
resuming play back of the multimedia data by the electronic device from the resume play back position when a resume condition has been met.

15. The method of claim 14, wherein the one of the respective time intervals is the respective time interval that immediately precedes the pause position.

16. The method of claim 14, wherein the one of the respective time intervals is the respective time interval that comprises a beginning of an Nth semantic statement preceding the pause position, wherein N≥2.

17. The method of claim 14, wherein the one of the respective time intervals is randomly selected by the electronic device.

18. The method of claim 14, wherein the semantic statement is a sentence or a paragraph, and the beginning of the semantic statement is a starting position of the sentence or the paragraph.

* * * * *